(12) United States Patent
Horev et al.

(10) Patent No.: US 11,748,632 B2
(45) Date of Patent: Sep. 5, 2023

(54) ANALYSIS OF ANOMALIES IN A FACILITY

(71) Applicant: SENSAI NETWORKS LTD., Haifa (IL)

(72) Inventors: Refael Horev, Tel Aviv (IL); Alaa Ghanaiem, Sakhnin (IL); Bar Vinograd, Yaffo (IL); Firas Ismael, Nahif (IL); Mohammad Badarna, Arraba (IL)

(73) Assignee: SENSAI NETWORKS LTD, Haifa (IL)

( * ) Notice: Subject to any disclaimer, the term of this patent is extended or adjusted under 35 U.S.C. 154(b) by 759 days.

(21) Appl. No.: 16/668,412

(22) Filed: Oct. 30, 2019

(65) Prior Publication Data

US 2021/0133593 A1 May 6, 2021

(51) Int. Cl.
*G06F 11/34* (2006.01)
*G06N 5/02* (2023.01)
*G06N 20/20* (2019.01)
*G05B 23/02* (2006.01)

(52) U.S. Cl.
CPC ........... *G06N 5/02* (2013.01); *G05B 23/0254* (2013.01); *G06F 11/3447* (2013.01); *G06N 20/20* (2019.01); *G05B 2219/32201* (2013.01)

(58) Field of Classification Search
CPC ............. G06F 11/3447; G06F 11/3452; G06F 11/3006; G06F 11/0793; G06F 11/3051; G06F 11/30; G06F 11/34
See application file for complete search history.

(56) References Cited

U.S. PATENT DOCUMENTS

| 2006/0064263 A1* | 3/2006 | Di Palma ............ G06F 11/3447 702/85 |
| 2011/0078291 A1 | 3/2011 | Bickson et al. |
| 2013/0080760 A1 | 3/2013 | Garrett et al. |

(Continued)

FOREIGN PATENT DOCUMENTS

| CN | 108089962 A | 5/2018 |
| CN | 109886153 A | 6/2019 |

OTHER PUBLICATIONS

Deng, L., & Yu, D. (2014). Deep learning: methods and applications. Foundations and trends in signal processing, 7(3-4), 197-387.

(Continued)

*Primary Examiner* — Yolanda L Wilson
(74) *Attorney, Agent, or Firm* — Browdy and Neimark, PLLC (57) ABSTRACT

There is provided a system and method of analysing anomalies in one or more electronic appliances including at least one computer. The method comprises, by a processor and memory circuitry, upon detection of a deviation of a given parameter representative of the one or more electronic appliances from an operational state, providing a model associated with the given parameter, wherein the model links one or more other parameters to the given parameter, wherein the one or more other parameters affect the given parameter, and based at least on the model, identifying, among the one or more other parameters, at least one parameter $P_j$ for which a change in its value allows bringing back the given parameter to the operational state.

14 Claims, 6 Drawing Sheets

(56) References Cited

U.S. PATENT DOCUMENTS

| | | | |
|---|---|---|---|
| 2014/0359376 A1* | 12/2014 | Fahimi | G06F 11/3485 |
| | | | 714/48 |
| 2015/0006972 A1 | 1/2015 | Jones | |
| 2016/0170476 A1* | 6/2016 | Fu | H04L 41/0813 |
| | | | 713/310 |
| 2016/0299938 A1 | 10/2016 | Malhotra | |
| 2017/0295224 A1* | 10/2017 | Tino | G06F 11/3452 |
| 2018/0083833 A1* | 3/2018 | Zoll | G06F 16/215 |
| 2018/0260560 A1* | 9/2018 | Gross | G06N 20/00 |
| 2019/0354420 A1* | 11/2019 | Venkatesan | G06F 11/0751 |
| 2021/0271388 A1* | 9/2021 | Dwarampudi | G06F 3/0641 |

OTHER PUBLICATIONS

Bengio, Y. (2009). Learning deep architectures for AI. Now Publishers Inc.

LeCun, Y., Bengio, Y., & Hinton, G. (2015). Deep learning. nature, 521(7553), 436-444.

https://en.wikipedia.org/wiki/Deep_learning.

* cited by examiner

ANALYSIS OF ANOMALIES IN A FACILITY

TECHNICAL FIELD

The presently disclosed subject matter relates, in general, to the field of analysis of anomalies in one or more electronic appliances.

BACKGROUND

A facility such as a data center, or a server farm, can include one or more electronic appliances, such as one or more computers. In many applications, requirements for reliability and availability of the facility are tough, and anomalies should be detected and handled in due course. Therefore, there is a need to propose new methods and systems of analyzing an anomaly in a facility including one or more electronic appliances.

GENERAL DESCRIPTION

In accordance with certain aspects of the presently disclosed subject matter, there is provided a method of analysing operation of one or more electronic appliances including at least one computer, comprising, by a processor and memory circuitry, upon detection of a deviation of a given parameter representative of the one or more electronic appliances from an operational state, providing a model associated with the given parameter, wherein the model links one or more other parameters to the given parameter, wherein the one or more other parameters affect the given parameter, and based at least on the model, identifying, among the one or more other parameters, at least one parameter $P_j$ for which a change in its value allows bringing back the given parameter to the operational state.

In addition to the above features, the method according to this aspect of the presently disclosed subject matter can optionally comprise one or more of features (i) to (vii) below, in any technically possible combination or permutation:
  i. the one or more other parameters include at least one of an operating parameter, which is measurable and representative of an operation over time and a configuration parameter, which is representative of at least one of a hardware and software configuration;
  ii. the method comprises feeding, in the model, one or more values of the one or other parameters corresponding to a time period including deviation of the given parameter from the operational state, to compute a predicted value of the given parameter, and comparing the predicted value of the given parameter with a value of the given parameter of this time period, to determine whether the model associated with the given parameter is valid;
  iii. the method comprises determining, based at least on the model and an operative range for which the given parameter is in an operational state, at least one value $V_j$ for the at least one parameter $P_j$, which allows bringing back the given parameter to the operational state;
  iv. the method comprises outputting the at least one value $V_j$ for the at least one parameter $P_j$;
  v. the method comprises, if the at least one parameter $P_j$ is a parameter which is mutable based on one or more other parameters:
    (1) providing a model associated with the at least one parameter $P_j$, wherein the model links one or more other parameters $P_{j'}$ to the at least one parameter $P_j$, wherein the one or more other parameters $P_{j'}$ affect the at least one parameter $P_j$, and
    (2) based at least on the model and $V_j$, identifying, among the one or more other parameters $P_{j'}$, at least one parameter $P_{j'*}$ for which a change in its value allows bringing the at least one parameter $P_j$ to the value $V_j$ according to a matching criteria;
  vi. if the at least one parameter $P_{j'*}$ is a directly mutable parameter, the method comprises determining at least one value $V_{j'*}$ for the at least one parameter $P_{j'*}$, wherein $V_{j'*}$ allows bringing the at least one parameter $P_j$ to the value $V_j$ according to the matching criteria. If the at least one parameter $P_{j'*}$ is a parameter which is mutable based on one or more other parameters, the method comprises for $P_j$ corresponding to $P_{j'*}$, repeating (1) and (2) until a convergence criterion is met; and
  vii. the method comprises periodically retraining the model associated with the given parameter based on data representative of the given parameter and data representative of the one or more other parameters collected during operation of the one or more electronic appliances.

In accordance with other aspects of the presently disclosed subject matter, there is provided a system of analysing operation of one or more electronic appliances including at least one computer, comprising a processor and memory circuitry configured to, upon detection of a deviation of a given parameter representative of the one or more electronic appliances from an operational state, provide a model associated with the given parameter, wherein the model links one or more other parameters to the given parameter, wherein the one or more other parameters affect the given parameter, and based at least on the model, identify, among the one or more other parameters, at least one parameter $P_j$ for which a change in its value allows bringing back the given parameter to the operational state.

In addition to the above features, the system according to this aspect of the presently disclosed subject matter can optionally comprise one or more of features (viii) to (xv) below, in any technically possible combination or permutation:
  viii. the one or more other parameters include at least one of an operating parameter, which is measurable and representative of an operation over time; and a configuration parameter, which is representative of at least one of a hardware and software configuration;
  ix. the system is configured to feed, in the model, one or more values of the one or other parameters corresponding to a time period including deviation of the given parameter from the operational state, to compute a predicted value of the given parameter, and to compare the predicted value of the given parameter with a value of the given parameter of this time period, to determine whether the model associated with the given parameter is valid;
  x. the system is configured to determine, based at least on the model and an operative range for which the given parameter is in an operational state, at least one value $V_j$ for the at least one parameter $P_j$, which allows bringing back the given parameter to the operational state;
  xi. the system is configured to output the at least one value $V_j$ for the at east one parameter $P_j$;
  xii. if the at least one parameter $P_j$ is a parameter which is mutable based on one or more other parameters, the system is configured to:

(1) provide a model associated with the at least one parameter $P_j$, wherein the model links one or more other parameters $P_{j'}$ to the at least one parameter $P_j$, wherein the one or more other parameters $P_{j'}$ affect the at least one parameter $P_j$, (2) based at least on the model and $V_j$, identify, among the one or more other parameters $P_{j'}$, at least one parameter $P_{j'*}$ for which a change in its value allows bringing the at least one parameter $P_j$ to the value $V_j$ according to a matching criteria;

xiii. if the at least one parameter $P_{j'*}$ is a directly mutable parameter, the system is configured to determine at least one value $V_{j'*}$ for the at least one parameter $P_{j'*}$, wherein $V_{j'*}$ allows bringing the at least one parameter $P_j$ to the value $V_j$ according to the matching criteria. If the at least one parameter $P_{j'*}$ is a parameter which is mutable based on one or more other parameters, the system is configured to, for $P_j$ corresponding to $P_{j'*}$, repeat (1) and (2) until a convergence criterion is met;

xiv. the system is configured to provide mutable parameters which affect directly or indirectly the given parameter, provide a plurality of models, wherein the plurality of models including a model for each of these mutable parameters, and solve an optimization problem based at least on the plurality of models and an operative range for which the given parameter is in an operational state, to identify one or more mutable parameters which are directly mutable and for which a change in their value allows bringing back the given parameter to its operational state; and xv. the system is configured to periodically retrain the model associated with the given parameter based on data representative of the given parameter and data representative of the one or more other parameters collected during operation of the one or more electronic appliances.

In accordance with other aspects of the presently disclosed subject matter, there is provided a system comprising a processor and memory circuitry configured to, for one or more electronic appliances comprising at least one computer, obtain, for at least one given parameter representative of the one or more electronic appliances, one or more other parameters which affect the at least one given parameter, wherein the at least one given parameter is representative of operation of the one or more electronic appliances over time, obtain data representative of the at least one given parameter and of the one or more other parameters over time, and build, based at least on the data, a model associated with the at least one given parameter, wherein the model is configured to provide a prediction of a value of the given parameter based on a value of the one or more other parameters, thereby facilitating identification of a cause of a deviation of the given parameter from an operational state.

According to some embodiments, for at least one parameter which is a discrete parameter which can be represented by discrete values $X_1$ to $X_N$, with $N>1$, the system is configured to add, to each discrete value $X_i$, with i from 1 to N, a signal which has an amplitude which is maximal at $X_i$ and which decreases for other discrete values $X_j$, with j different from i.

According to some embodiments, there is provided a non-transitory computer readable medium comprising instructions that, when executed by a processor and memory circuitry (PMC), cause the PMC to perform operations as recited above.

In accordance with other aspects of the presently disclosed subject matter, there is provided a non-transitory computer readable medium comprising instructions that, when executed by a processor and memory circuitry (PMC), cause the PMC to perform operations comprising upon detection of a deviation of a given parameter representative of the one or more electronic appliances from an operational state, providing a model associated with the given parameter, wherein the model links one or more other parameters to the given parameter, wherein the one or more other parameters affect the given parameter, and based at least on the model, identifying, among the one or more other parameters, at least one parameter $P_j$ for which a change in its value allows bringing back the given parameter to the operational state.

In addition to the above features, the non-transitory computer readable medium according to this aspect of the presently disclosed subject matter can optionally comprise instructions that, when executed by a processor and memory circuitry (PMC), cause the PMC to perform operations as mentioned in features (viii) to (xvi), in any of their possible technical combination.

According to some embodiments, the proposed solution allows analyzing anomalies in a facility (including one or more electronic appliances) in an efficient way.

According to some embodiments, the proposed solution allows analyzing anomalies in a facility within a short reaction time. Therefore, according to some embodiments, the anomaly can be treated quickly, which ensures reliability and availability of the facility.

According to some embodiments, the proposed solution allows understanding the cause of anomalies although it can include parameters of various different layers (e.g. network layer, application layer, etc.) of the facility.

According to some embodiments, the proposed solution allows understanding the cause of anomalies in complex facilities, which can include large collections of servers, switches and other infrastructures, and which can be divided into a plurality of clusters.

According to some embodiments, the proposed solution allows automatically analyzing anomalies in a facility.

According to some embodiments, the proposed solution automatically determines modifications to be applied to parameters to overcome the anomaly.

According to some embodiments, the proposed solution is flexible and adapts to various different types of facilities including one or more electronic appliances.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "detecting", "obtaining", "providing", "identifying", "feeding", "comparing", "determining", "outputting", "building", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single computer or multiple computers, which may be located in the same geographical zone or may, at least partially, be located in different zones and may be able to communicate together.

The terms "non-transitory memory" and "non-transitory computer readable medium" used herein should be expansively construed to cover any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
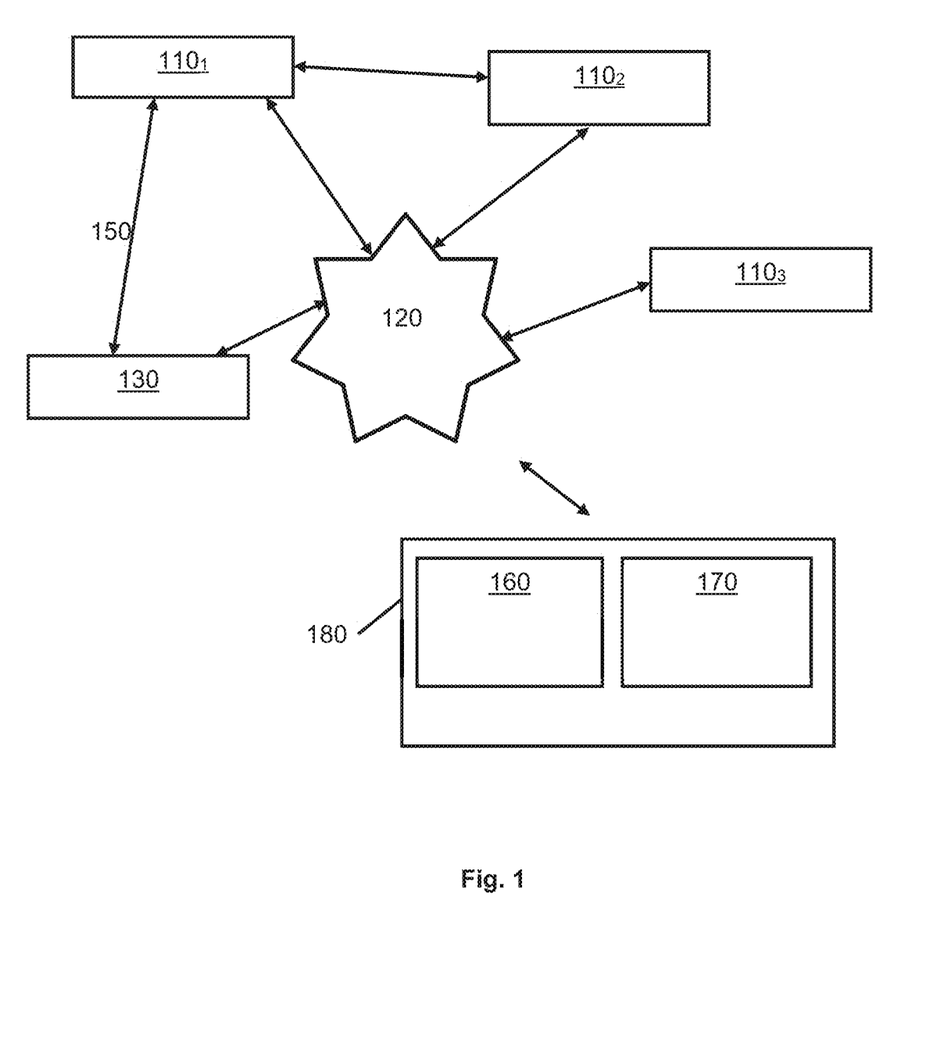
FIG. 1 illustrates a generalized block diagram of a facility and of a system to analyze anomalies in the facility.

Attention is drawn to FIG. 1, in which one or more electronic appliances are depicted. The group of one or more electronic appliances is designated hereinafter as a facility 100.

The one or more electronic appliance includes one or more computers. In this example, computers $110_1$, $110_2$, $110_3$ are depicted. The computers can include e.g. a server, a laptop, a PC, a terminal, a handheld computer, a cellular phone, etc. In some embodiments, the electronic appliances can comprise additional electronic appliances 130, such as a printer, a scanner, a biometric recognition device, a modem, a router, etc.

As shown in FIG. 1, according to some embodiments, the electronic appliances can be operatively connected. In particular, they can exchange data between them, e.g. directly through wire and/or wireless communication (reference 150), and/or through a network 120 (e.g. Internet, Intranet, etc.).

According to some embodiments, facility 100 can be a Data Center. Data Center is a facility that centralizes an organization's IT operation and equipment. Data center offers different types of services such as storage, computing abilities, video streaming, and other services. A data center typically includes one or more servers and one or more databases.

According to some embodiments, facility 100 can be a server farm, a home network, etc. These examples are not limitative. In some embodiments, facility 100 includes a single computer.

As shown in FIG. 1, system 180 can communicate with one or more electronic appliances of the facility 100. System 180 is configured to perform one or more of the methods described hereinafter, in particular to analyze one or more anomalies which can occur in connection with the one or more electronic appliances. As explained hereinafter, system 180 can assist an operator (or a device) to understand the cause of the anomaly, and in some embodiments, can assist the operator (or a device) to take appropriate measures to solve, or at least mitigate, the anomaly.

System 180 includes a processor 160 (any kind of hardware-based electronic device with data processing capabilities, such as a microprocessor) and memory circuity 170 (e.g. non-transitory memory). At least some, or all methods described hereinafter, can be executed by the processor 160 based on instructions stored in the memory circuity 170.

According to some embodiments, system 180 can include or can be connected to a display for outputting data, and to an interface (e.g. keyboard) allowing an operator to enter data.

In some embodiments, system 180 is partially or totally implemented within one (or more, if the system is distributed) computer of the facility 100.

Figure 2:
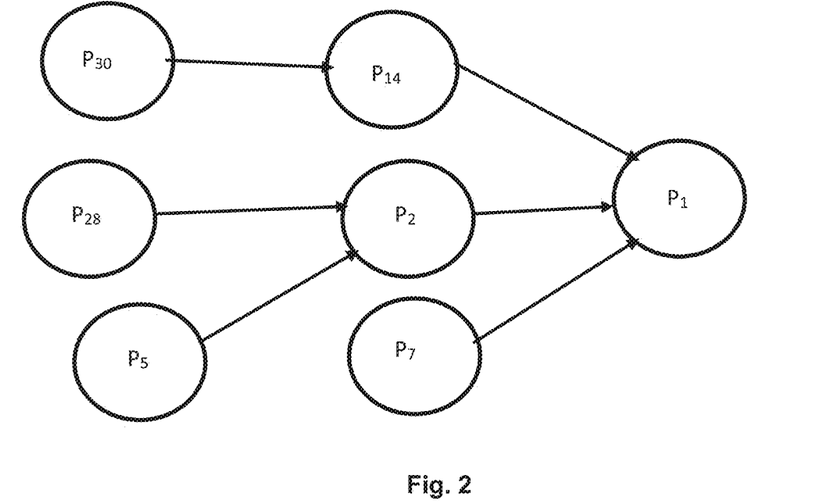
FIG. 2 illustrates schematically a graph of causality defining links between parameters relevant for describing operation of the facility.

Attention is now drawn to FIG. 2. Assume that operation and configuration of the one or more electronic appliances can be defined by a list of N parameters.

These parameters include technical parameters considered as relevant for the operation of the one or more electronic appliances which are monitored. According to some embodiments, the parameters can belong to various different layers (e.g. network layer, application layer, etc.).

The N parameters include one or more operating parameters, which can vary over time and can be measured.

These operating parameters can include parameters representative of a performance of the electronic appliances, and/or of a status of the electronic appliances over time.

In some embodiments, the operating parameters can include parameters representative of a performance and/or of a status of external devices (e.g. electronic appliances/devices which are external to the facility 100) and/or external software (e.g. applications/software, etc. which are linked to devices or appliances which are external to the facility 100), but which are considered as relevant for analyzing operation of the one or more electronic appliances of the facility 100.

Examples of operating parameters include e.g. CPU load, traffic load, number of requests to a server, electricity consumption, memory usage, queues, etc. This list is not limitative.

The operating parameters can include parameters representative of hardware operation (e.g. CPU load, etc.) and/or software operation (e.g. number of sessions opened for a software, etc.).

In addition to the operating parameters, the list of N parameters can include additional hardware and/or software parameters which are relevant for analyzing operation of the one or more electronic appliances. These additional parameters can include e.g.:

parameters representative of a (hardware anchor software) configuration of the one or more electronic appliances of the facility 100, and/or parameters representative of a configuration of one or more external hardware devices (e.g. electronic appliances which are not part of the facility 100), and/or of one or more external software (e.g. applications, virtual network, etc., which are linked to devices or appliances which are external to the facility 100).

Examples of these additional parameters include e.g. cache size, display parameters, set-up selected for the OS, number of computers, processor version, software version, size of available physical memory, etc.

Among the N parameters, some parameters are not mutable, and some of the parameters are mutable.

The non-mutable parameters correspond to parameters which are fixed. This can include for example the number of computers, processor version, software version, size of available physical memory, etc. These examples are however not limitative, and an operator can define that some of these parameters are to be considered as mutable (e.g. the operator would agree to purchase and install additional computers, and/or additional physical memory in the facility, and therefore defines the number of computers and/or the physical memory as a mutable parameter).

The mutable parameters correspond to parameters which can be changed, e.g. by an operator and/or a device.

Some of the mutable parameters are directly mutable, that it to say that an operator (or a device) can change their value by themselves and it is not required to act on other parameters of the N parameters. For example, this can include size allocated to the cache memory, set-up configuration, etc.

Some of the mutable parameters are not directly mutable, that it to say that an operator (or a device) cannot change their value by themselves (there is a need to operate on other parameters, e.g. of the N parameters, in order to affect them). For example, traffic load cannot be directly muted, and there is a need to change other parameters (e.g. distribution of the traffic by a router, etc.) to affect it.

The list of parameters can be represented by a graph of causality. Indeed, at least some of the parameters are affected by other parameters. For example, CPU load is affected by the number of open applications, version of the processor, traffic load, etc. Generally, an operator defines the graph of causality, based e.g. on his knowledge of the facility 100. In some embodiments, simulations and/or real data can be used to improve definition of the graph of causality.

According to some embodiments, a parameter $P_2$ can be considered as affecting a parameter $P_1$ if a change in a value of $P_2$ causes a change in a value of $P_1$ (as explained hereinafter, only direct causality is stored in the graph).

Therefore, for each of a plurality of given parameters, it is possible to associate one or more other parameters which affect the given parameter.

Note that only parameters which directly affect the given parameter are associated with it. For example, (see FIG. 2) assume parameter $P_1$ is affected by parameter $P_2$, which is itself affected by parameter $P_5$. Then only parameter $P_2$ will be associated with parameter $P_1$ and not parameter $P_5$ (parameter $P_5$ will be associated with parameter $P_2$).

Some parameters can affect each other mutually. For example, parameter $P_2$ affects parameter $P_1$, and parameter $P_1$ also affects parameter $P_2$. In this case, the graph of causality will store that, for parameter $P_1$, one of the parameters which affect it is parameter $P_2$. The graph of causality will also store that, for parameter $P_2$, one of the parameters which affect it is parameter $P_1$.

The graph of causality includes a data structure (e.g. a graph of nodes, or a table, or any adapted data structure) in which each of the N parameters is associated with other parameters of the N parameters which affect it.

A parameter can be affected by other parameters which can include different types of parameters (e.g. operating parameters, hardware/software configuration parameters, etc.), and which include parameters of electronic appliances of the facility or parameters which are external to the facility.

If a given parameter is not affected by other parameters of the list of parameters, then no parameter is stored in the graph of causality as affecting this given parameter.

Figure 3:
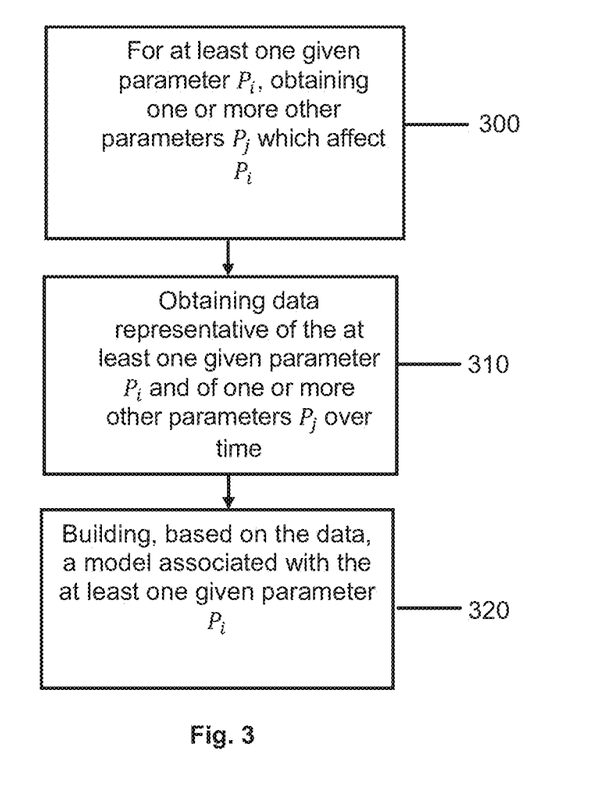
FIG. 3 illustrates a generalized flow-chart of a method of training one or more models linking parameters representative of the facility, based on the graph of causality.

Attention is now drawn to FIG. 3, which depicts a method of building a model representative of at least one parameter of the facility 100.

Assume a given parameter $P_i$ of the facility 100 is provided. The given parameter $P_i$ is typically an operating parameter which is representative of operation of the one or more electronic appliances over time. As explained above, its value generally varies over time.

The method can include obtaining (reference 300) one or more other parameters $P_j$ (if a plurality of parameters are obtained then $P_j$ corresponds to parameters $P_{j_1}$ to $P_{j_{max}}$) which affect the at least one given parameter $P_i$. As explained with reference to FIG. 2, this can be obtained from the graph of causality. According to some embodiments, when building a model associated with the given parameter $P_i$ as explained in operation 320, the graph of causality is assumed to have a Markovian behavior, that it to say that $P_i$ is assumed to be caused only by parameters $P_j$.

The method can include obtaining (reference 310) data representative of the at least one given parameter $P_i$ and of the one or more other parameters $P_j$ over time. This data can correspond to real data collected in the field, and/or to simulation data representative of operation of the facility.

Data representative of the given parameter $P_i$ can be provided e.g. by one or more of the electronic appliances itself (which provides report on status/performance), and/or by any adapted sensor. For example, if $P_i$ is CPU load of a computer 100, then the operating system of the computer generally provides this value. If $P_i$ corresponds to electric consumption of a computer 100, then a plug load monitor located between the computer and the outlet can be used. These examples are not limitative.

Data representative of the given parameter $P_i$ are collected over one or more periods of time, and can be stored in a memory, e.g. memory 170.

Concerning data representative of the one or more other parameters $P_j$, if parameter $P_j$ is also an operating parameter which varies over time, then it can be measured similarly to what was described for $P_i$, during the same periods of time for which data has been collected for $P_i$.

If parameter $P_j$ corresponds to a configuration parameter (e.g. hardware and/or software configuration), which generally does not evolve over time, then it is sufficient to collect the corresponding value once. For example, the number of computers, the version of a software, the size of the physical memory, etc. can be obtained by an input of an operator (which can enter the values in system 180) and/or by communicating with the relevant devices.

The method can further include building (320), based on the collected data, a model associated with the at least one given parameter. In particular, the model is trained to predict, based on the one or more other parameters $P_j$, the value(s) of the given parameter $P_i$. The model can be implemented by processor 160.

According to some embodiments, a machine learning network, such as a deep learning network, can be used for the model. This is not limitative and according to some embodiments, other types of models can be used, such as SVM, decision tree, etc.

Example of a deep learning network is provided hereinafter.

A deep learning network be implemented in several ways, such as Deep neural networks, Deep belief networks, Convolutional neural networks, Convolutional Deep Belief Networks, Stacked (Denoising) Auto-Encoders, Deep stacking networks, and Deep Recurrent Neural Networks.

Various articles describe the principles of deep learning algorithms, such as: Deng, L., Yu, D. (2014) "Deep Learning: Methods and Applications" Foundations and Trends in Signal Processing 7: 3-4, Bengio, Yoshua (2009), "Learning Deep Architectures for AI", Foundations and Trends in Machine Learning 2 (1): 1-127, Yann LeCun, Yoshua Bengio, & Geoffrey Hinton, Deep Learning, Nature 521, 436-444, 2015, and Wikipedia, https://en.wikipedia.org/wiki/Deep_learning. These documents are incorporated herein by reference.

The machine learning network can comprise a plurality of layers (input layer, hidden layer(s) and output layer).

Each layer can include multiple basic computational elements (CE) typically referred to in the art as dimensions, neurons, or nodes. Computational elements of a given layer can be connected with CEs of a preceding layer and/or a subsequent layer. Each connection between CE of a preceding layer and CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer.

The input layer of the machine learning network can receive data collected for the one or more other parameters $P_j$ during a plurality of periods of time. The machine learning network attempts to predict the value of $P_i$, based on the values of $P_j$. For example, based on current value of $P_j$ at time $t_N$, the machine learning algorithm attempts to predict current value of $P_i$ at time $t_N$. In some embodiments, the machine learning algorithm attempts to predict current value of $P_i$ at time $t_N$ based on current value of $P_j$ at time $t_N$ and past values of $P_j$ from time $t_M$ to time $t_N$ (with M<N).

After each iteration, a difference can be determined between the actual output (prediction of $P_i$) produced by the machine learning network and the target output (true value of $P_i$) associated with the respective training set of data. The difference can be referred to as an error value. Training can be determined to be complete when a cost function indicative of the error value is less than a predetermined value, or when a limited change in performance between iterations is achieved.

An output of the method of FIG. 3 is therefore, for the given parameter $P_i$, a model which is able to predict, based on parameters $P_j$ (which have been defined in the graph of causality as affecting $P_i$), the value of $P_i$. As mentioned above, according to some embodiments, the model is able to predict current value of $P_i$ at time $t_N$ based on current value(s) of $P_j$ at time $t_N$ (and in some embodiments, based also on past values of $P_j$ from time $t_M$ to time $t_N$, with M<N).

Figure 3A:
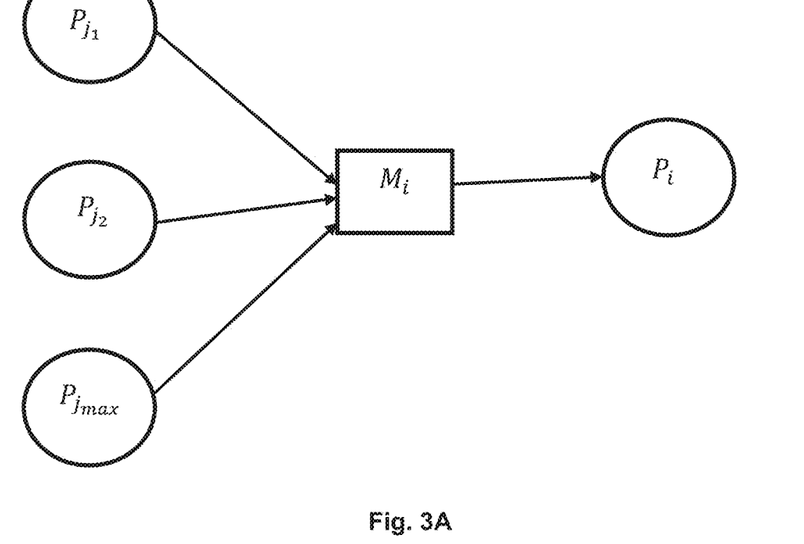
FIG. 3A illustrates a generalized functional block diagram of a model linking parameters of the facility, which was obtained based on the method of FIG. 3.

This is shown in FIG. 3A, in which a model $M_i$ can predict value of $P_i$ based on data representative of $P_j$ ($P_{j_1}$ to $P_{j_{max}}$).

According to some embodiments, the method of FIG. 3 can be performed for each given parameter representative of the facility 100 which is an operating parameter which varies over time (and represents e.g. performance and/or status of the facility 100).

For example, assume that the facility 100 is represented by N parameters. Among N parameters, only $N_1$ different parameters ($N_1$<N) correspond to operating parameters, and therefore only $N_1$ different models need to be built.

In some embodiments, assume the facility 100 comprises a plurality of computers and a given parameter is e.g. the CPU load. Although each computer has its own CPU load, according to some embodiments, it is not necessary to build a model for this given parameter for each computer separately, and a common model for parameter "CPU load" can be built for all computers (provided of course that this given parameter is caused by the same parameters in the graph of causality for all computers).

The common model can be trained using the method of FIG. 3.

This is however not mandatory, and in some embodiments, several models can be built for a given parameter (e.g. for example because the facility is divided into a plurality of cluster of computers, and the CPU load in a first cluster behaves differently from the CPU load in a second cluster, or for other reasons).

Depending on the nature of each parameter, values of the parameter can be represented e.g. by a number, a vector, a matrix, etc.

According to some embodiments, the training phase can be performed as follows. Data $D_{raw}$ is collected for all relevant parameters over one or more periods of time (as mentioned, some of the parameters do not evolve over time and therefore need to be collected only once). These data, together with the graph of causality (see e.g. FIG. 2) are fed to system 180, which:

automatically detects which parameters correspond to varying operating parameters and for which a model needs to be created (data can be stored in the graph of causality which indicates nature of each parameter, and system 180 can use these data to detect the operating parameters);

for each given operating parameter:
- determine which other parameters affect the given operating parameter based on the graph of causality;
- extract, from $D_{raw}$, the values of the given operating parameter and of the other parameters which affect the given operating parameter;
- build a model for the given operating parameter based on the extracted data (similarly to what was described in operation 320 of FIG. 3).

Figure 4:
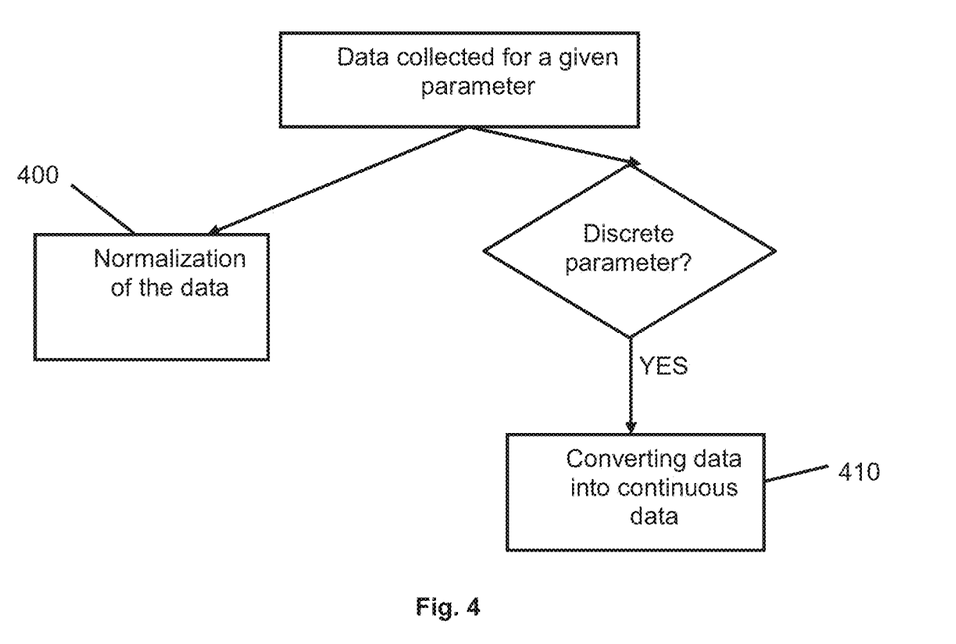
FIG. 4 illustrates a generalized flow-chart of a method of pre-processing collected data.

Attention is now drawn to FIG. 4, which describes a method of pre-processing data collected for the parameters.

According to some embodiments, the method can include, for at least one parameter, normalizing (400) the collected data (into a common format).

For example, assume value of the cache memory is collected from different computers. Some of the data can be stored in bytes, and some of the data can be stored in kilobytes, therefore data is converted into a common unit (e.g. bytes—the common format can be defined by an operator, or can be pre-set in the system 180).

According to some embodiments, normalization can include scaling the collected data. For example, assume that for a first computer a parameter is expressed on a scale from 0 to 100, and that for a second computer the same parameter is expressed on a scale from 0 to 1. Normalization can include converting the collected data into a common scale. The common scale can be defined e.g. by an operator, or can be already pre-set in the system 180.

According to some embodiments, the method can include converting (410) discrete data (which can include numerical and/or non-numerical values) into more continuous data. This conversion is used only in the training phase (see FIG. 3) in which the model is built. During the prediction phase in which an anomaly in the facility 100 is analyzed (see hereinafter), the discrete values can be used as an input of the model.

If the discrete data corresponds to discrete non-numerical values (e.g. names of categories), they can be first converted into discrete numerical values.

Assume that the discrete data can have only discrete values $X_1, \ldots, X_N$. In some embodiments, the method can include first converting each discrete value into a vector, using e.g. a one-hot representation. For example, $X_1$ will be represented as $[1; 0; \ldots; 0]$, $\ldots$, $X_N$ will be represented as $[0; 0; \ldots; 1]$.

Operation 410 can include adding, to each discrete value $X_i$ (in some embodiments, after conversion into the one-hot representation), a signal which smoothens transition between different values of the parameter. In particular, the signal can have an amplitude which has a maximum at the value $X_i$, and decreases when it approaches other values $X_j$ (with j different from i). For example, a Gaussian noise can be added. This is not limitative.

For example, (see FIG. 5), assume a simple example in which a parameter can have only two values, 0 and 1.

Figure 5:
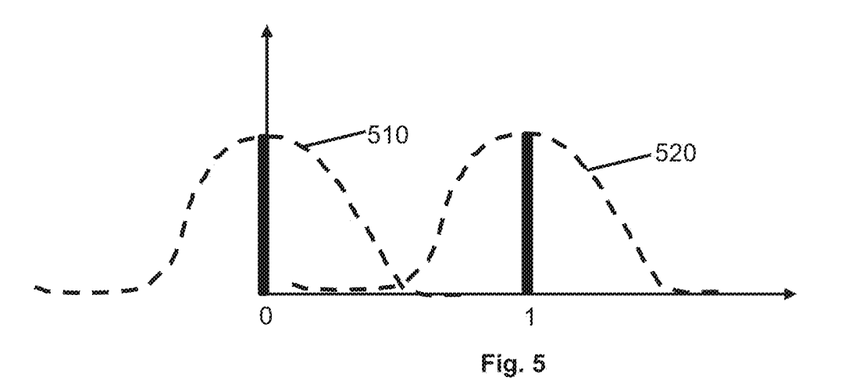
FIG. 5 illustrates signals that can be used to convert discrete data into continuous data during pre-processing of FIG. 4A.

If the discrete parameter has value 0, then a Gaussian noise 510 is added to its value, such that the resulting signal has a maximal amplitude at 0, and decreases when it moves away from value 0. In some embodiments, the negative values of the Gaussian noise can be set to zero.

If the discrete parameter has value 1, then a Gaussian noise 520 is added to its value, such that the resulting signal has a maximal amplitude at 1, and decreases when it moves away from value 1.

The example of FIG. 5 can be applied similarly to a vector including a plurality of values (such as a one-hot representation).

As visible in FIG. 5, this help smoothing the transition between different discrete values of the parameter.

Figure 6:
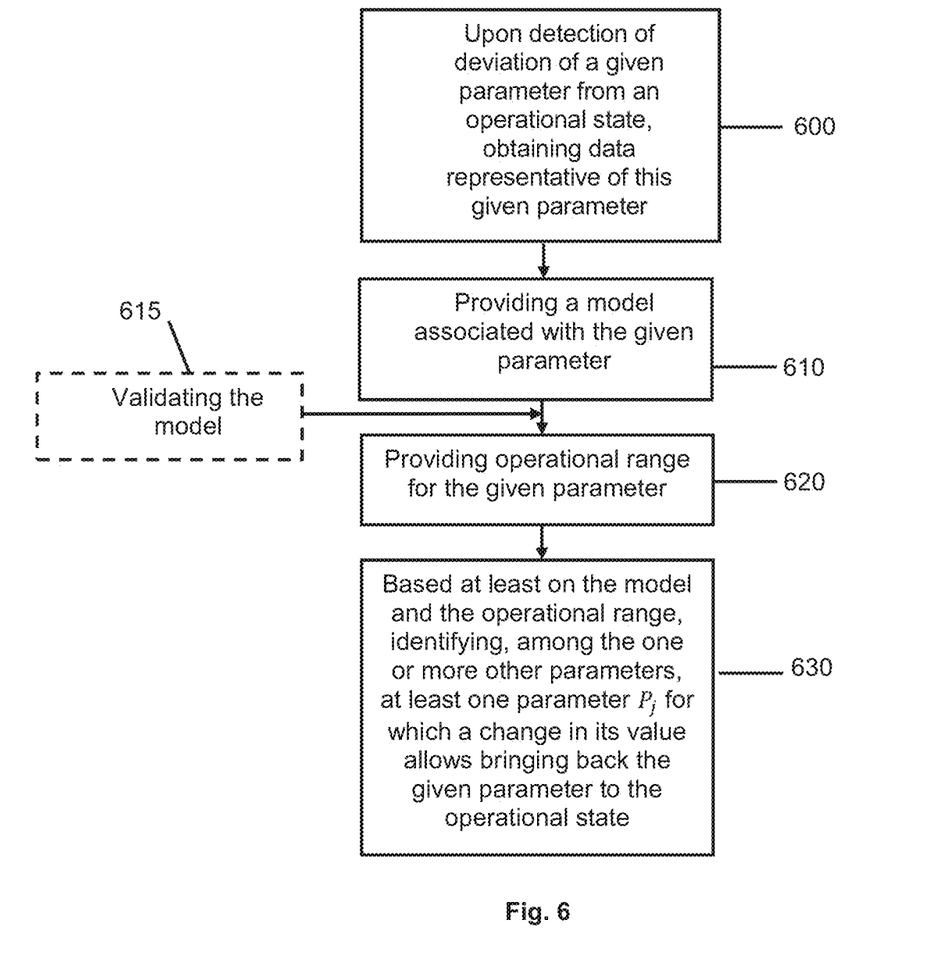
FIG. 6 illustrates a generalized flow-chart of a method of analyzing one or more anomalies in the facility.

Attention is now drawn to FIG. 6, which describes a method of analyzing one or more anomalies in the facility 100.

During operation of the facility 100, a deviation of at least one given parameter from an operational state can be detected. This deviation corresponds to an anomaly.

This deviation can be detected in operating parameters which are representative of operation of the facility and are measured over time.

For example, the CPU load is above an operative range, the cache memory reaches a saturation value, etc.

According to some embodiments, this deviation from an operational state can be detected by comparing the value of the parameter with operational data (the operational data defines one or more values of the parameter for which the parameter corresponds to an operational state, and not to an anomaly) associated with it.

According to some embodiments, this detection can be performed e.g. by the electronic appliances themselves (which implement, using a processor and memory circuity, a function of monitoring various parameters of the electronic appliance), and/or by dedicated monitoring or security devices (e.g. devices which comprise a processor and memory circuity configured to collect data and check whether a deviation from an operational state is present, by comparing measured values with stored values corresponding to operational data).

Deviation from an operational state can be detected upon reception of an indicator of a failure. For example, an electronic appliance (e.g. computer, printer) sends a failure signal. The failure signal can be e.g. a failure signal associated with one of its components (failure of the processor, of the screen, of a software, etc.), or some other failure signal associated with the electronic appliance.

Assume that for a given parameter $P_i$, a deviation from an operational state has been detected at time T. For example, CPU load of a computer of the facility 100 has been measured as above its operational range (for which it is considered as being in an operational state).

The method can include obtaining (e.g. from the electronic appliances, and/or from sensors) data representative of the given parameter (in other words, values of the given parameters over time). The data can correspond to data which have been collected over a period of time $[T_1;T]$, with $T_1<T$ (previous data). Size of the period of time can be pre-set, or can be defined by an operator.

According to some embodiments, data representative of the given parameter can correspond to data which have been collected over a period of time $[T_1;T_2]$, with $T_1<T<T_2$, i.e. data collected after detection of the anomaly are also taken into account.

The method can include providing (610) a model $M_i$ associated with the given parameter $P_i$. The model $M_i$ can be computed using e.g. the method of FIG. 3, during a training phase. As mentioned above, the model $M_i$ links one or more other parameters $P_j$ to the given parameter $P_i$, wherein the one or more other parameters $P_j$ affect (as defined by the graph of causality) the given parameter $P_i$.

For example, if $P_i$ is CPU load, then other parameters $P_j$ ($P_{j_1}$ to $P_{j_{max}}$) can include e.g. number of running applications, processor version, cache memory, etc.

According to some embodiments, the method can include an operation of validating (615) the model. This validation can include injecting, in the model $M_i$, the values of $P_j$ (e.g. collected at time t within a period of time in which the anomaly has been detected) and computing the value $P_i$ predicted by the model $M_i$. The predicted value of $P_i$ can be compared to the real value of $P_i$ at time t, as collected in the facility 100. If a difference between the two values is below a threshold (this comparison can be performed for different values of t), then the model $M_i$ can be considered as valid. If a difference between the two values is above the threshold, then the method can include outputting an indication that the model $M_i$ cannot be used and needs to be retrained.

The method can include providing (620) operational range for which the given parameter is an operational state.

The operational range can correspond to one or more values for which the given parameter is an operational state (that is to say that when the given parameter has a value within the operational range, no anomaly is present in this given parameter).

For example, the operational data of parameter "CPU load" can correspond to a range $[X_0;X_1]$, and current CPU load has a value $X_2$ which has been detected as abnormal because $X_2 > X_1$. This indicates that the CPU load is higher than a normal CPU load.

The method can include, based at least on the model $M_i$ and the operational data, identifying (630), among the one or more other parameters, at least one parameter $P_j$ for which a change in its value allows bringing back the given parameter $P_i$ to the operational state. Operation 630 can provide one or more parameters $P_j$ which are identified as the cause of the anomaly. In some embodiments, operation 630 can further include providing recommended values of the one or more parameters $P_j$ in order to bring back $P_i$ to its operational state.

Operation 630 can include performing an optimization (e.g. constrained optimization), as explained hereinafter.

Assume that the model $M_i$ links parameters $P_{j_1}, P_{j_2}, \ldots, P_{j_{max}}$ to parameter $P_i$. In other words, $M_i(P_{j_1}, P_{j_2}, \ldots, P_{j_{max}})$ provides predicted value(s) of $P_i$.

The constrained optimization can include finding one or more sets of values $S_i$, with $S_i = (P_{j_1}, P_{j_2}, \ldots, P_{j_{max}})$, for which $P_i = M_i(S_i)$ is in the operational range (representative of an operational state), denoted $V_i$.

This can be expressed as follows:

$$\operatorname{argmin}_{S_i} |V_i - M_i(S_i)| \qquad \text{(Equation 1)}$$

with $V_i$ corresponding to operational range of $P_i$

According to some embodiments, it is intended to bring back the value of $P_i$ to a specific value or sub-range $V'_i$ of $P_i$. For example, operative range $V_i$ of CPU load is between 80 and 90 but it is desired to bring back the CPU load to a specific value $V'_i = 85$. This constraint can be taken into account by replacing $V_i$ by $V'_i$ in Equation 1.

According to some embodiments, in this optimization process, some of the values of $S_i$ cannot be changed. Indeed, as already explained above, some of the parameters are non-mutable parameters and, by definition, are not parameters which can be optimized. For example, this includes the number of computers, the version of the processor, etc. (as explained above, this is not limitative, and the operator can decide whether to consider one or more of these parameters as mutable parameters).

Therefore, if $S_i$ includes non-mutable parameters, then the optimization will be performed only on a subset $S^{\#}_i$ of $S_i$ which does not include the non-mutable parameters (the non-mutable parameters of $S_i$ are kept to their original values, e.g. at the time of the anomaly, and are frozen during the optimization process).

This can be expressed as follows:

$$\operatorname{argmin}_{S^{\#}_i} |V_i - M_i(S_i)| \qquad \text{(Equation 2)}$$

with $V_i$ corresponding to operational range of $P_i$

According to some embodiments, in the optimization process, some of the values of $S_i$ can also be constrained by one or more constraints. Indeed, the one or more other parameters $P_j$ which affect parameter $P_i$ also represent real parameters and therefore are also generally constrained.

Parameters $P_j$ which correspond to operation parameters are constrained by their operational range, for which they correspond to an operational state (this is similar to parameter $P_i$ for which it is desired to bring it back to an operational range representative of an operational state in the facility 100). Therefore, in the optimization process, these constraints can be taken into account. For example, if $P_j$ includes traffic load between computers, then an operative range can be defined for this value (e.g. above a threshold, the traffic load is indicative of an overload and therefore of an anomaly), and this operative range can be also taken into account in the optimization process.

Some of the parameters $P_j$ can correspond to configuration parameters which are also constrained by physical reality and need to be in an admissible range. For example, cache memory cannot have an infinite or negative value, etc.

Other constraints can also come from a representation used for the parameters. For example, a parameter which corresponds to categorical values (e.g. categories A, B, . . . , Z), can be encoded using a one hot representation (category A is represented e.g. by a vector $[1; 0; \ldots; 0]$, category B is represented e.g. by a vector $[0; 1; \ldots; 0]$, etc.). As a consequence of this encoding, value of this parameter is constrained and can be selected only among the different vectors used for the one hot representation.

These constraints can be taken into account in the optimization process.

The optimization problem, which takes into account these additional constraints, can be expressed as follows:

$$\operatorname{argmin}_{S^{\#}_i} |V_i - M_i(S_i)| \qquad \text{(Equation 3)}$$

with $V_i$ corresponding to operational data of $P_i$
with $S^{\#}_i$ in the operational range/admissible range According to some embodiments, various other constraints can taken into account in the optimization problem.

According to some embodiments, it is preferred to find a solution $S_i$ to an optimization problem including at least one penalty function F. The penalty function can reflect e.g. one or more constraints to be met for the solution $S_i$.

The optimization problem can be expressed as follows:

$$\operatorname{argmin}_{S^{\#}_i} |V_i - M_i(S_i)| + F(S_i) \qquad \text{(Equation 4)}$$

with $V_i$ corresponding to operational data of $P_i$
with $S^{\#}_i$ in the operational range/admissible range
with F the penalty function A non-limitative example of a penalty function includes that the change in one or more of the parameters $P_j$ is as small as possible (thereby allowing smooth transition between current state and next state). The corresponding penalty function can be expressed as follows:

$$F(S_i) = |S_i - S_i(t)|$$

with $S_i(t)$ including current values of parameters $P_j$ (e.g. at the time at which the anomaly has been detected)

This example is not limitative.

According to some embodiments, the operator of the facility 100 can provide additional constraints to be met in the optimization problem.

For example, the operator indicates that he can accept that the CPU load is slightly above its operational range as long as it is not required to dedicate more cache memory.

In another example, some constraints can be linked to financial resources. The operator indicates that some of the parameters $P_j$ (which require higher financial investment)

should be changed as less as possible, while other parameters $P_j$ (which require less financial investment) can be changed freely.

Solving the optimization problem (see above various ways to express it) can rely on various techniques, such as optimization algorithms (a non-limitative example includes Stochastic Gradient Descent, or other adapted optimization algorithms) or constrained optimization algorithms (a non-limitative example includes Projected Stochastic Gradient Descent (PSGD), or other adapted algorithms). PSGD generally operates with a model which can be represented by a function which can have a derivative (e.g. this can be used for machine learning network, SVM, etc.).

If solving the optimization problem indicates that there is no solution, then a corresponding output can be provided, e.g. to an operator or a device, indicating that the cause of the anomaly has not been identified.

If solving the optimization problem provides at least one solution $S_i$, then this solution can be used to analyse the anomaly.

Assume that $S_i$ indicates that parameter $P_{j_k}$ should be changed from value $V_1$ (current value) to value $V_2$, in order to bring back $P_i$ to its operating range.

The method can include outputting an information (e.g. to an operator or device) indicating that parameter $P_{j_k}$ is one possible cause of the anomaly.

Figure 6A:
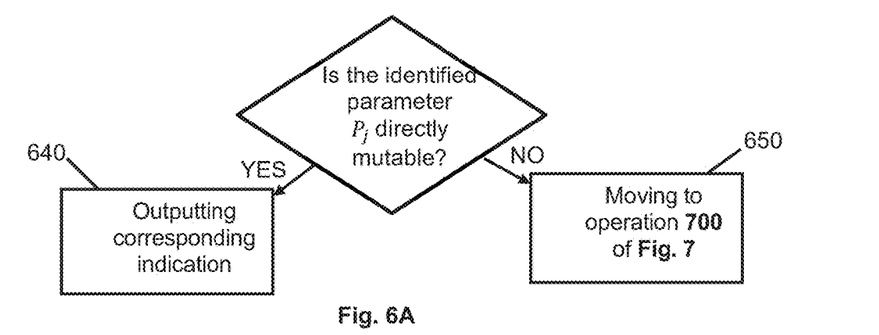
FIG. 6A illustrates a generalized flow-chart of a method of handling an output of the method of FIG. 6.

If parameter $P_{j_k}$ is a parameter which can be directly modified, then the method can include outputting one or more values (in this example $V_2$) that should be assigned to $P_{j_k}$ in order to overcome the anomaly (operation 640). A directly modifiable parameter includes a parameter for which it is not necessary to act on other parameters to modify this parameter.

For example, if $P_{j_k}$ corresponds to cache memory of a computer that should be increased to new value $V_2$, then this information can be output to an operator.

In some embodiments, the information indicative that parameter $P_{j_k}$ needs to be modified to a new value can be output to a device. In some cases, the device can automatically change the value of parameter $P_{j_k}$ to the new value proposed by system 180. For example, the device is a computer. Assume for example that the parameter is cache memory, then the computer automatically changes the value of the cache memory based on the information provided by system 180.

Figure 7:
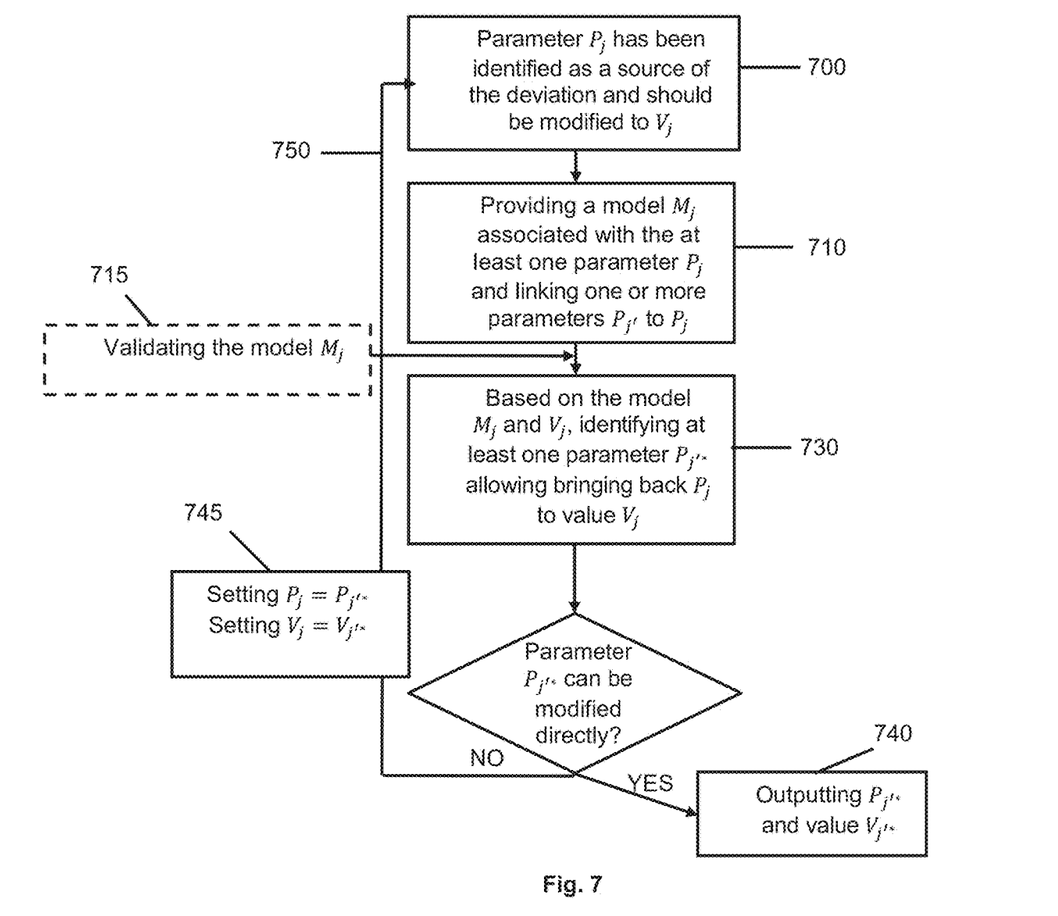
FIG. 7 illustrates a generalized flow-chart of a method of iteratively identifying additional parameters which indirectly (through other parameters) cause the anomaly.

If parameter $P_{j_k}$ is a parameter which cannot be directly modified (see reference 650), then the method can move to operation 700 of FIG. 7.

If solving the optimization problem provides a plurality of different solutions $S_{i_1}, \ldots, S_{i_{max}}$, then the method can include different ways to handle them.

According to some embodiments, the different solutions are output to the operator (or to a device), who can select the solution that fits the best the needs and constraints of the facility 100.

According to some embodiments, the method can include automatically selecting one of the solutions based on pre-stored criteria. For example, the operator has already indicated that a subset of parameters should be modified as less as possible, and that another subset of parameters can be modified more freely. Based on these criteria, the method can include comparing each solution with the operator's criteria, and selecting the solution which best fits.

Attention is now drawn to FIG. 7.

According to some embodiments, assume that solving the optimization problem provides at least one solution $S_i$ which includes at least one parameter $P_j$ which should be modified to a new value $V_j$.

Assume that parameter $P_j$ is not directly mutable (that is to say that this parameter $P_j$ is not mutable by itself but is mutable by modifying other parameters).

This information can be output to an operator and/or to a device. According to some embodiments, since it is attempted to overcome the anomaly, further investigation of the cause of the anomaly can be performed.

Indeed, since parameter $P_j$ cannot be directly modified per se, an operator or a device cannot overcome the anomaly at this stage.

In this case, the method can include performing an iterative optimization process, to identify additional parameters that can be modified in order to overcome the anomaly.

As shown in FIG. 7, once parameter $P_j$ has been identified as a source of the anomaly and should be modified to $V_j$ (operation 700), the method can include providing a model $M_j$ associated with the at least one parameter $P_j$ and linking one or more other parameters $P_{j'}$ (including $P_{j'_1}, P_{j'_2}, \ldots P_{j'_{max}}$) to $P_j$. This operation is similar to operation 610 above and therefore is not described again.

According to some embodiments, the method can include an operation of validating (715) the model $M_j$. This operation is similar to operation 615 above. This validation can include injecting, in the model $M_j$, the values of $P_{j'}$ (e.g. collected at time t within a period of time in which the anomaly has been detected) and computing the value $P_j$ predicted by the model $M_j$. The predicted value of $P_j$ can be compared to the real value of $P_j$ collected at time t. If a difference between the two values is below a threshold (this comparison can be performed for different values of t), then the model $M_j$ is valid. If a difference between the two values is above the threshold, then the method can include outputting an indication that the model $M_j$ cannot be used, and needs to be retrained.

The method can further include (730), based on the model $M_j$ and value(s) $V_j$, identifying at least one parameter (among parameters $P_{j'}$) for which a change in its value allows bringing the at least one parameter $P_j$ to the value $V_j$ according to a matching criteria. The matching criteria can define e.g. a maximal acceptable difference between $P_j$ and $V_j$.

Operation 730 is similar to operation 630 described above. Operation 730 can include solving a second optimization problem (the first optimization problem corresponding to operation 630).

For example, equations similar to Equations 1, 2 or 3 can be used, which can be modified as explained below.

Equation 1 can be modified as follows:

$$\mathrm{argmin}_{S_{j'}} |V_j - M_j(S_{j'})| \qquad \text{(Equation 1')}$$

with $S_{j'} = (P_{j'_1}, P_{j'_2}, \ldots P_{j'_{max}})$

In other words, it is attempted to bring back $P_j$ to the value $V_j$, so that $P_i$ will be brought back to its operational range $V_i$.

Equation 2 can be modified as follows:

$$\mathrm{argmin}_{S_{j'}^\#} |V_j - M_j(S_{j'})| \qquad \text{(Equation 2')}$$

with $S_{j'}^\#$ including only mutable parameters of $S_{j'}$.

Equation 3 can be modified as follows:

$$\mathrm{argmin}_{S_{j'}^\#} |V_j - M_j(S_{j'})| \qquad \text{(Equation 3')}$$

with $S_{j'}^\#$ including only mutable parameters of $S_{j'}$,
with $S_{j'}^\#$ in the operational range/admissible range Equation 4 can be modified as follows:

$$\mathrm{argmin}_{S_{j'}^\#} |V_j - M_j(S_{j'})| + F(S_{j'})$$

with $P_i$ a value corresponding to its operational data
with $S_i^\#$ in the operational range/admissible range
with F a penalty function As already mentioned above, a non-limitative example of the penalty function can be expressed as follows:

$$F(S_{j'}) = |S_{j'} - S_{j'}(t)| \qquad \text{(Equation 4')}$$

with $S_{j'}(t)$ including current values of parameters $P_{j'}$ (e.g. at the time at which the anomaly has been detected)

The different embodiments and variants described for operation 630 apply herein and are not described again.

If the second optimization problem does not provide any solution, then this can be output to the operator.

If the at least one solution $S_{j'}$ indicates that a parameter $P_{j'*}$ should be modified, and that it should have new value $V_{j'*}$, then this information can be output (740) to an operator and/or to a device.

If the parameter $P_{j'*}$ can be modified directly, then the method ends. Indeed, it has been now determined that modifying $P_{j'*}$ will cause a change in parameter $P_j$ which in turn will cause a change in parameter $P_i$ in which the anomaly has been detected. In particular, changing $P_{j'*}$ to new value $V_{j'*}$ will cause parameter $P_j$ to reach new value $V_j$ which in turn will cause parameter $P_i$ to reach new value $V_i$.

If the parameter $P_{j'*}$ cannot be modified directly, then the method can be iteratively repeated, as shown in reference 750 of FIG. 7 (when repeating the method in FIG. 7, $P_j$ now corresponds to $P_{j'*}$, and $V_j$ now corresponds to $V_{j'*}$, as mentioned in reference 745). The method will include searching other parameters which can cause $P_{j'*}$ to reach new value $V_{j'*}$, which in turn will cause $P_j$ to reach new value $V_j$, which in turn will cause $P_i$ to reach new value $V_i$.

A non-limitative example of the method is provided hereinafter.

Assume a network device is flooded with requests. This causes a high rate of received traffic. As a consequence, the network device opens a large number of processes, which cause a high memory usage which is out of the acceptable range.

Upon detection (see operation 600) of the high memory usage (the operating parameter "memory usage" is denoted $P_i$), the method provides the acceptable operating range of the memory usage (operation 620) and a model $M_i$ (operation 610) associated with this parameter ("memory usage"). The model is validated (see operation 615) using data collected for the memory usage and data collected for all parameters affecting the memory usage. Upon validation of the model, the method provides (operation 630), based on the model and the operating range of the memory usage, that the number of processes (the parameter "number of processes" is denoted $P_j$), should be reduced to a new value ($V_j$), in order to bring back the memory usage to is operating range.

The method includes providing a model (denoted $M_j$) for parameter "number of processes" (see operation 710). The model $M_j$ is validated (operation 715) based on data collected for the number of processes and data collected for parameters affecting the number of processes. The method provides (operation 730), based on the model $M_j$ and the new value $V_j$, that the rate of received traffic (the parameter "rate of received traffic" is denoted $P_{j'*}$) should be reduced at the network device (to a new value $V_{j'*}$) in order to reduce the number of processes. This information is output to an operator (operation 740).

The method of FIG. 7 can be repeated until a convergence criterion is met.

The convergence criterion can include e.g. that the method has reached a situation in which only directly mutable parameter(s) have been identified as the source of the anomaly. Therefore, it is not necessary to further investigate the source of the anomaly since it is possible to overcome it by modifying all of these directly mutable parameters.

The convergence criterion can include e.g. that the method fails to solve an optimization problem. This can be output to the operator.

According to some embodiments, the first optimization problem (which is solved at operation 630) and/or subsequent optimization problems (which are solved at operation 730, at one or more iterations) can include a solution which comprises a plurality of parameters to be changed.

In this case, the methods described beforehand apply equivalently. For the parameters which are mutable directly, then the method can include outputting these parameters to the operator and/or to a device. This output can include the new value(s) to be reached.

For the parameters which are not mutable directly, then the method can include further investigating the source of the anomaly as explained with reference to FIG. 7. Again, the method of FIG. 7 can output a plurality of other parameters that need to be changed. Each of the parameters can be treated as explained above: parameters which are directly mutable can be output to the operator and/or to a device, whereas parameters which are not directly mutable are further investigated using the method of FIG. 7. Therefore, after application of the method, it can turn out that the given parameter can be brought back to an operational state by modifying a plurality of other parameters which have been identified as a source of the anomaly in the given parameter.

According to some embodiments, it can appear that the solutions of the various optimization problems present a contradiction. For example, a first optimization problem indicates that cache memory has to be increased, whereas a second optimization problem indicates that cache memory has to be decreased.

In this situation, the method can include outputting an information that the system is unable to solve the anomaly.

In some embodiments, this contradictory situation can occur only for a subset of the possible solutions. For example, assume that:
 the first optimization problem outputs $N_1$ different sets of solutions,
 the second optimization problem outputs $N_2$ different sets of solutions, and
 only a subset $SB_1$ of the $N_1$ sets of solutions contradicts the $N_2$ sets of solutions.

In this case, this contradiction can be used to eliminate the subset $SB_1$ as possible solutions of the first optimization problem.

In FIG. 7, it has been described an iterative algorithm, in which a plurality of N optimization problems are successively solved, until all possible parameters that can be muted directly are identified (if necessary, the method provides their associated recommended values for solving the anomaly). According to some embodiments, the method of FIG. 7 can be applied by solving the N optimization problems together. In other words, the N optimization problems are formulated into a single optimization problem. This can be done by composing models, in the same way as mathematical functions can be composed.

Figure 7A:
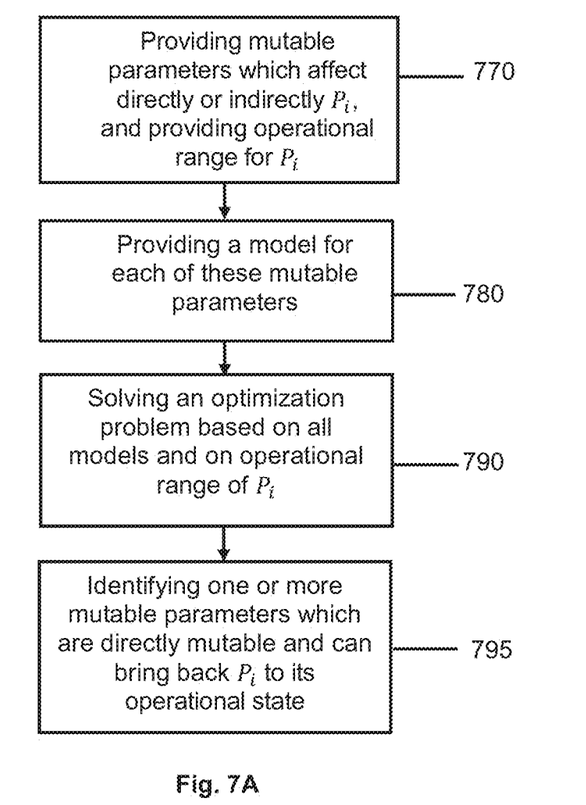
FIG. 7A illustrates a generalized flow-chart of a method of identifying parameters causing directly and/or indirectly the anomaly, which includes solving a general optimization problem.

As a non-limitative example, this can include merging Equation 2 and 2' as follows:

$$\mathrm{argmin}_{S_j} \# |(\mathrm{argmin}_{S^\#_i} |V_i - M_i(S_i)| - M_j(S_{j'})|  \quad \text{(Equation 2''')}$$

with $S_i^\#$ including only mutable parameters of $S_i$
with $S_j^\#$ including only mutable parameters of $S_{j'}$ This method (in which a single optimization problem is formulated) can be summarized as follows (see FIG. 7A). The method can include providing (operation 770) mutable parameters which affect directly or indirectly (through one or more other intermediate parameters) the given parameter. As explained above, the parameters affect each other, and this can be represented by a chain of causality (graph of causality), as shown e.g. in FIG. 2.

According to some embodiments, in operation 770, all mutable parameters which affect directly or indirectly $P_i$ are provided along each path of the graph of causality, until the first mutable parameter which is directly mutable is reached for this path (because in this case it is not necessary to investigate further parameters for this path, since the first mutable parameter can be directly handled to solve the anomaly).

For example, in FIG. 2, parameters $P_5$, $P_{28}$ and $P_{30}$ affect indirectly $P_1$.

Assume parameters $P_5$, $P_{14}$, $P_{28}$ are directly mutable parameters, and $P_2$ is not a directly mutable parameter. For path from $P_1$ to $P_{28}$, parameter $P_{28}$ will be provided. For path from $P_1$ to $P_5$, parameter $P_5$ will be provided. For path from $P_1$ to $P_{30}$, parameter $P_{14}$ will be provided.

The method can include providing (operation 780) a model for mutable parameters which have been identified (in operation 770) as affecting directly or indirectly the given parameter. This allows formulating a single optimization problem (by taking into account the operational range $V_i$ of the given parameter $P_i$, for which $P_i$ is in operational state). A non-limitative example of a single optimization problem is provided in Equation 2' above.

It is then attempted to solve this single optimization problem (operation 790). If a solution is found (795), this allows identifying one or more mutable parameters which are directly mutable and for which a change in their value allows bringing back (in some cases indirectly through all the other parameters which are located on their path in the graph of causality) the given parameter $P_i$ to the operational state.

Figure 8:
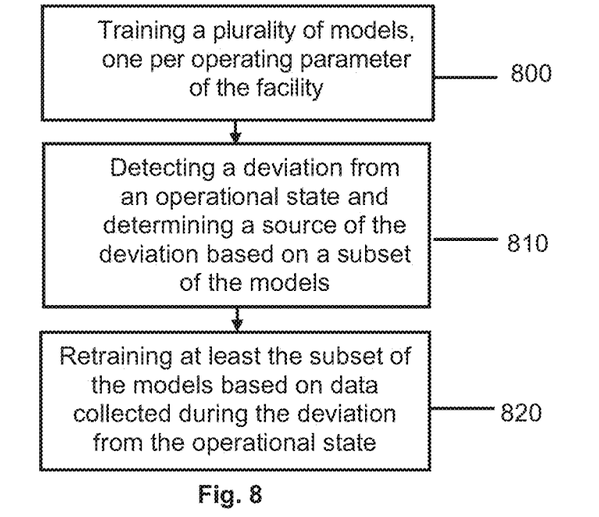
FIG. 8 illustrates a generalized flow-chart of a method of periodically retraining one or more models of the parameters.

Attention is drawn to FIG. 8. Assume a model has been trained for each operating parameter of the facility (operation 800). According to some embodiments, the method can include periodically retraining at least a subset of the different models associated with the different parameters of the facility 100, based on data collected during operation of the facility 100.

In particular, assume a given parameter has encountered an anomaly, and one or more other parameters have been identified by the method as requiring a change in their value. Then for all of these parameters, the method can include retraining at least each of their models, based on real data, and in particular which have been collected during detection of the anomaly (operations 810, 820).

In some embodiments, all the models are retrained from time to time using real data collected during operation of the facility 100, irrespective of whether or not they have been used in detection of an anomaly.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A method of analysing solving an anomaly in an operation of one or more electronic appliances including at least one computer, the method comprising, by a processor and memory circuitry:

upon detection of the anomaly corresponding to a deviation of a given parameter representative of the one or more electronic appliances from an operational state,
    obtaining a given computer-implemented machine learning model associated with the given parameter, wherein the given computer-implemented machine learning model links one or more other parameters to the given parameter, wherein the one or more other parameters affect the given parameter,
    based at least on the given computer-implemented machine learning model, identifying, among the one or more other parameters, at least one parameter $P_j$ for which a change in its value allows bringing back the given parameter to the operational state,
    determining, based at least on the given computer-implemented machine learning model and an operative range for which the given parameter is in an operational state, at least one value $V_j$ for the at least one parameter $P_j$, which allows bringing back the given parameter to the operational state, wherein, when the at least one parameter $P_j$ is a parameter which is mutable based on one or more other parameters, the method comprises:
    (1) obtaining another computer-implemented machine learning model associated with the at least one parameter $P_j$, wherein said another computer-implemented machine learning model links one or more other parameters $P_{j'}$ to the at least one parameter $P_j$, wherein the one or more other parameters $P_{j'}$ affect the at least one parameter $P_j$,
    (2) based at least on said another computer-implemented machine learning model and $V_j$, identifying, among the one or more other parameters $P_{j'}$, at least one parameter $P_{j'*}$ for which a change in its value to a new value $V_{j'*}$ allows bringing the at least one parameter $P_j$ to the value $V_j$ according to a matching criterion,
wherein, when the at least one parameter $P_{j'*}$ is a directly mutable parameter of a given electronic appliance of the one or more electronic appliances, the method comprises sending, by the processor and memory circuitry, a command to the given electronic appliance to automatically change the value of the at least one parameter $P_{j*}$ to reach the new value $V_{j*}$, thereby enabling bringing back the given parameter representative of the one or more electronic appliances to its operational state, to solve the anomaly.

2. The method of claim 1, wherein the one or more other parameters include at least one of:
an operating parameter, which is measurable and representative of an operation over time; and
a configuration parameter, which is representative of at least one of a hardware and software configuration.

3. The method of claim 1, comprising:
feeding, in the given computer-implemented machine learning model, one or more values of the one or other parameters corresponding to a time period including deviation of the given parameter from the operational state, to compute a predicted value of the given parameter, and
comparing the predicted value of the given parameter with a value of the given parameter of this time period, to determine whether the given computer-implemented machine learning model associated with the given parameter is valid.

4. The method of claim 1, comprising outputting the at least one value $V_j$ for the at least one parameter $P_j$.

5. The method of claim 1, comprising periodically retraining the given computer-implemented machine learning model associated with the given parameter based on data representative of the given parameter and data representative of the one or more other parameters collected during operation of the one or more electronic appliances.

6. A system of solving an anomaly in an operation of one or more electronic appliances including at least one computer, comprising a processor and memory circuitry configured to:
upon detection of the anomaly corresponding to a deviation of a given parameter representative of the one or more electronic appliances from an operational state,
obtain a given computer-implemented machine learning model associated with the given parameter, wherein the given computer-implemented machine learning model links one or more other parameters to the given parameter, wherein the one or more other parameters affect the given parameter,
based at least on the given computer-implemented machine learning model, identify, among the one or more other parameters, at least one parameter $P_j$ for which a change in its value allows bringing back the given parameter to the operational state,
determine, based at least on the given computer-implemented machine learning model and an operative range for which the given parameter is in an operational state, at least one value $V_j$ for the at least one parameter $P_j$, which allows bringing back the given parameter to the operational state, wherein, when the at least one parameter $P_j$ is a parameter which is mutable based on one or more other parameters, the system is configured to:
(1) obtain another computer-implemented machine learning model associated with the at least one parameter $P_j$, wherein said another computer-implemented machine learning model links one or more other parameters $P_{j'}$ to the at least one parameter $P_j$,
wherein the one or more other parameters $P_{j'}$ affect the at least one parameter $P_j$,
(2) based at least on said another computer-implemented machine learning model and $V_j$, identify, among the one or more other parameters $P_{j'}$, at least one parameter $P_{j'*}$ for which a change in its value to a new value $V_{j'*}$ allows bringing the at least one parameter $P_j$ to the value $V_j$ according to a matching criterion,
wherein, when the at least one parameter $P_{j*}$ is a directly mutable parameter of a given electronic appliance of the one or more electronic appliances, the processor and memory circuitry is configured to send a command to the given electronic appliance to automatically change the value of the at least one parameter $P_{j*}$ to reach the new value $V_{j*}$, thereby enabling bringing back the given parameter representative of the one or more electronic appliances to its operational state, to solve the anomaly.

7. The system of claim 6, wherein the one or more other parameters include at least one of:
an operating parameter, which is measurable and representative of an operation over time; and
a configuration parameter, which is representative of at least one of a hardware and software configuration.

8. The system of claim 6, configured to:
feed, in the given computer-implemented machine learning model, one or more values of the one or other parameters corresponding to a time period including deviation of the given parameter from the operational state, to compute a predicted value of the given parameter, and
compare the predicted value of the given parameter with a value of the given parameter of this time period, to determine whether the given computer-implemented machine learning model associated with the given parameter is valid.

9. The system of claim 6, configured to output the at least one value $V_j$ for the at least one parameter $P_j$.

10. The system of claim 6, wherein the system is configured to:
provide mutable parameters which affect directly or indirectly the given parameter;
provide a plurality of computer-implemented machine learning models, wherein the plurality of computer-implemented machine learning models includes a computer-implemented machine learning model for each of these mutable parameters;
solve an optimization problem based at least on the plurality of computer-implemented machine learning models and an operative range for which the given parameter is in an operational state, to identify one or more mutable parameters which are directly mutable and for which a change in their value allows bringing back the given parameter to its operational state.

11. The system of claim 6, configured to periodically retrain the given computer-implemented machine learning model associated with the given parameter based on data representative of the given parameter and data representative of the one or more other parameters collected during operation of the one or more electronic appliances.

12. The system of claim 6, configured to:
obtain data representative of the at least one given parameter and of the one or more other parameters over time, and build, based at least on the data, the given computer-implemented machine learning model associated with the at least one given parameter, wherein the given computer-implemented machine learning model is configured to provide a prediction of a value of the given parameter based on a value of the one or more other parameters.

13. The system of claim 12, wherein, for at least one parameter which is a discrete parameter which can be represented by discrete values $X_1$ to $X_N$, with $N>1$, the system is configured to add, to each discrete value $X_i$, with i from 1 to N, a signal which has an amplitude which is maximal at $X_i$ and which decreases for other discrete values $X_j$, with j different from i.

14. A non-transitory computer readable medium comprising instructions that, when executed by a processor and memory circuitry (PMC), cause the PMC to perform operations comprising:

upon detection of an anomaly corresponding to a deviation of a given parameter representative of one or more electronic appliances from an operational state, wherein the one or more electronic appliances include at least one computer,
 providing a given computer-implemented machine learning model associated with the given parameter, wherein the given computer-implemented machine learning model links one or more other parameters to the given parameter, wherein the one or more other parameters affect the given parameter, and
 based at least on the given computer-implemented machine learning model, identifying, among the one or more other parameters, at least one parameter $P_j$ for which a change in its value allows bringing back the given parameter to the operational state,
 determining, based at least on the given computer-implemented machine learning model and an operative range for which the given parameter is in an operational state, at least one value $V_j$ for the at least one parameter $P_j$, which allows bringing back the given parameter to the operational state, wherein, when the at least one parameter $P_j$ is a parameter which is mutable based on one or more other parameters, the method operations comprises:
 (1) providing another computer-implemented machine learning model associated with the at least one parameter $P_j$, wherein said another computer-implemented machine learning model links one or more other parameters $P_{j'}$ to the at least one parameter $P_j$, wherein the one or more other parameters $P_{j'}$ affect the at least one parameter $P_j$,
 (2) based at least on said another computer-implemented machine learning model and $V_j$, identifying, among the one or more other parameters $P_{j'}$, at least one parameter $P_{j'*}$ for which a change in its value to a new value $V_{j'*}$ allows bringing the at least one parameter $P_j$ to the value $V_j$ according to a matching criterion,
 wherein, when the at least one parameter $P_{j'*}$ is a directly mutable parameter of a given electronic appliance of the one or more electronic appliances, the operations comprise sending, by the processor and memory circuitry, a command to the given electronic appliance to automatically change the value of the at least one parameter $P_{j'*}$ to reach the new value $V_{j'*}$, thereby enabling bringing back the given parameter representative of the one or more electronic appliances to its operational state, to solve the anomaly.

\* \* \* \* \*